United States Patent [19]

Johnson et al.

[11] Patent Number: 4,789,530

[45] Date of Patent: Dec. 6, 1988

[54] ABSORPTION OF HYDROGEN SULFIDE WITH AN ALKALI METAL ETHYLENEDIAMINETETRAACETATE AND/OR ALKALI METAL NITRILOTRIACETATE

[75] Inventors: Marvin M. Johnson; Ted H. Cymbaluk; Gerhard P. Nowack, all of Bartlesville, Okla.

[73] Assignee: Phillips Petroleum Company, Bartlesville, Okla.

[21] Appl. No.: 130,765

[22] Filed: Dec. 9, 1987

[51] Int. Cl.$^4$ .................. G01B 17/16; C01B 31/20
[52] U.S. Cl. ............................ 423/226; 423/228
[58] Field of Search .......................... 423/226, 228

[56] References Cited

U.S. PATENT DOCUMENTS

| | | | |
|---|---|---|---|
| 3,126,253 | 3/1964 | Podschus | 23/66 |
| 3,137,654 | 6/1964 | Johnson et al. | 252/189 |
| 3,226,320 | 12/1965 | Meuly et al. | 210/63 |
| 3,372,981 | 3/1968 | Ravner et al. | 23/4 |
| 3,622,273 | 11/1971 | Roberts et al. | 23/225 R |
| 3,672,125 | 6/1972 | Miller | 55/73 |
| 3,923,954 | 12/1975 | Petrey, Jr. et al. | 423/210 |
| 4,091,073 | 5/1978 | Winkler | 423/26 |
| 4,147,754 | 4/1979 | Ward, III | 423/224 |
| 4,400,361 | 8/1983 | Shafer | 423/226 |
| 4,431,616 | 2/1984 | Chou | 423/226 |
| 4,436,713 | 3/1984 | Olson | 423/573 G |
| 4,443,418 | 4/1984 | Lutz | 423/226 |
| 4,485,082 | 11/1984 | Blytas | 423/573 G |

FOREIGN PATENT DOCUMENTS 0234027 3/1986 Fed. Rep. of Germany ...... 423/228

OTHER PUBLICATIONS

Kirk-Othmer, "Encyclopedia of Chemical Technology", vol. 1, 1978, pp. 53-55 and 88-96.
Kirk-Othmer, "Encyclopedia of Chemical Technology", vol. 7, 1979, pp. 135-142.

Primary Examiner—John Doll
Assistant Examiner—Lori S. Freeman
Attorney, Agent, or Firm—K. K. Brandes

[57] ABSTRACT

A process for the preferential absorption of $H_2S$ from a gas which contains $H_2S$ and $CO_2$ comprises contacting of the gas with a sorbent solution comprising alkali metal ethylenediaminetetraacetate and/or alkali metal nitrilotriacetate, in the substantial absence of oxidizing agents which can oxidize $H_2S$.

20 Claims, 5 Drawing Sheets 4,789,530

ABSORPTION OF HYDROGEN SULFIDE WITH AN ALKALI METAL ETHYLENEDIAMINETETRAACETATE AND/OR ALKALI METAL NITRILOTRIACETATE

BACKGROUND OF THE INVENTION

This invention relates to a process for absorbing $H_2S$ from a gas. In another aspect, this invention relates to the selective absorption of $H_2S$ from a gas which also contains $CO_2$.

Many industrial gas streams, in particular natural gas and refinery gases, contain both $H_2S$ and $CO_2$ as impurities. Numerous processes for the preferential removal of $H_2S$ from these gas streams, as well as for the desorption of absorbed $H_2S$, are known. However, there is an ever present need to develop new $H_2S$ absorbing agents, which are more effective in separating $H_2S$ and $CO_2$ than those commonly employed.

SUMMARY OF THE INVENTION

It is an object of this invention to provide a process for the preferential removal of $H_2S$ from gases which contain both $H_2S$ and $CO_2$. It is another object of this invention to provide a process for absorbing and thereafter desorbing $H_2S$. Other objects and advantages will be apparent from the detailed disclosure and the appended claims.

In accordance with this invention, a process for absorbing $H_2S$ from a gas comprises the step of (a) contacting a gas feed comprising $H_2S$ (hydrogen sulfide) and $CO_2$ (carbon dioxide) with a solution comprising at least one dissolved sorbent selected from the group consisting of alkali metal ethylenediaminetetraacetate and alkali metal nitrilotriacetate, in the substantial absence of oxidizing agents which can oxidize $H_2S$ (such as oxidizing compounds of polyvalent metals, in particular compounds of Fe in the oxidation state $+3$), in an absorption zone under such contacting conditions as to absorb a greater portion per unit time of $H_2S$ than $CO_2$ from the gas feed.

In a preferred embodiment, the process of this invention comprises the additional step of (b) substantially desorbing $H_2S$, which has been absorbed by said solution comprising said at least one sorbent in step (a). Preferably the desorption of $H_2S$ is carried out by applying heat and/or reduced pressure to the sorbent solution containing absorbed $H_2S$ and $CO_2$, more preferably followed by step of (c) removing desorbed $H_2S$ from the gas (vapor) phase above the thus regenerated sorbent solution. The thus regenerated sorbent solution can be recycled to the absorption zone of step (a) and reused for the preferential absorption of $H_2S$ in accordance with the process of this invention.

DETAILED DESCRIPTION OF THE INVENTION

Figure 1:
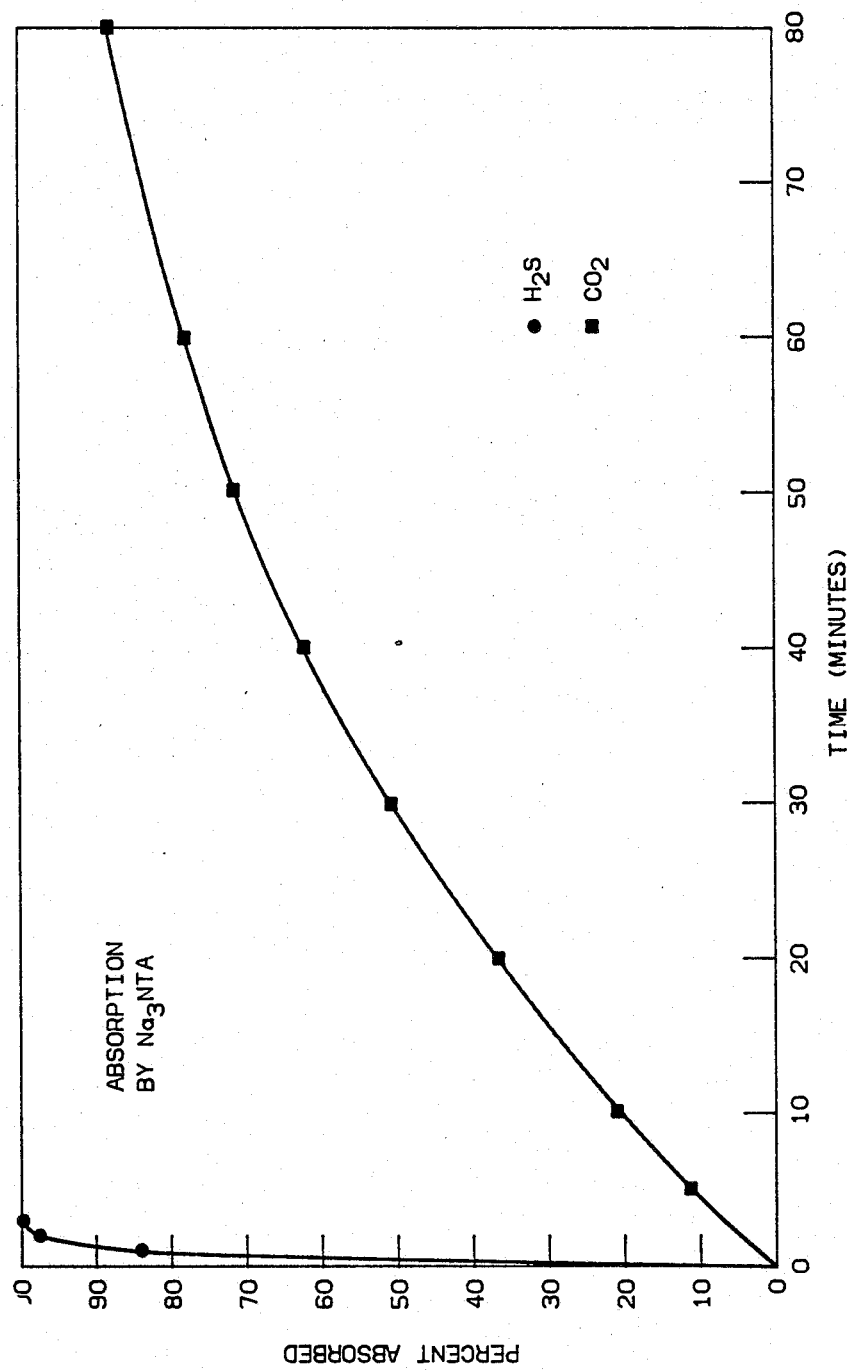
FIG. 1 shows the rates of absorption of $H_2S$ and $CO_2$ by a 1.14 molar aqueous solution of trisodium nitrilotriacetate.

The present invention can be used to purify any suitable gas feed (also herein referred to as "gas mixture", "gas stream", "gas feed stream" or "gaseous feed stream") which contains both hydrogen sulfide and carbon dioxide. It is understood that the term "stream", as used herein, applies to continuous processes, as well as batch processes. The $H_2S$ content in these gas streams generally is in the range of from about 0.001 to about 10 volume percent $H_2S$, and preferably is in the range of from about 0.1 to about 3 volume percent $H_2S$. The $CO_2$ content in these gas streams generally is in the range of from about 0.1 to about 20 volume percent $CO_2$, and preferably is in the range of from about 1 to about 10 volume percent $CO_2$. Strong oxidizing gases (such as ozone) which can oxidize absorbed $H_2S$ to elemental sulfur or to compounds of sulfur in a positive oxidation state, e.g., $H_2SO_3$ or $H_2SO_4$, should be substantially absent from the gas feed.

Non-limiting examples of suitable gas feed streams are natural gas, fractions of natural gas, gas streams from the distillation of crude oil, gases formed by the pyrolysis of coal (including lignite), gas streams obtained in processes for liquefying coal (including lignite), industrial waste gases, and the like. It is understood that these gas streams may contain other undesirable impurities besides $H_2S$ and $CO_2$, such as CO, $SO_x$ (sulfur oxides), $NO_x$ (nitrogen oxides), arsine, and the like. However, the amounts of these other impurities should not exceed levels at which they significantly interfere with the preferential absorption of $H_2S$ in accordance with this invention.

The sorbent of this invention can be any dissolved alkali metal ethylenediaminetetraacetate or alkali metal nitrilotriacetate or mixtures of any of these compounds (also referred to as salts). The preferred alkali metal salts are sodium or potassium salts. Presently particularly preferred are tetrapotassium ethylenediaminetetraacetate ($K_4EDTA$) and trisodium nitrilotriacetate ($Na_3NTA$). The above-recited sorbent compounds can be dissolved in any suitable solvent, such as water, lower aliphatic alcohols (e.g., those having 1-6 C atoms per molecule), esters such as ethyl acetate, ketones such as acetone, and the like, and mixtures of the above. Preferably water is used as a solvent.

Any suitable concentration of dissolved sorbent compounds in these solutions (preferably aqueous) can be employed. Preferably, the concentration of alkali metal ethylenediaminetetraacetate or alkali metal nitrilotiracetate is in the range of from about 0.5 to about 3 mol/l, more preferably in the range of from about 1 to about 2 mol/l.

Since the absorbed hydrogen sulfide is to be removed from the absorbent solution (so as to regenerate the sorbent solution for re-use), oxidizing agents that can oxidize absorbed $H_2S$ to elemental sulfur (or to compounds with sulfur in a positive oxidation state) should be substantially absent from the sorbent solution. In particular, hydrogen peroxide and ferric compounds (i.e., compounds of Fe in the oxidation state $+3$, such as ferric complexes of ethylenediaminetetraacetic acid, or of nitrilotriacetic acid, or of salts of these two acids) should be substantially absent from the sorbent solution. Also oxidizing compounds of other polyvalent metals (in particular transition metals) in their higher oxidation states, such as compounds of $Sn^{+4}$, $V^{+5}$ $Cr^{+6}$, $Mo^{+6}$, $Mn^{+7}$, $Mn^{+6}$, $Co^{+3}$, and the like, should be substantially absent from the sorbent solution. It is understood that trace amounts of these oxidizing compounds may be present as long as they do not significantly interfere with the absorption and desorption of $H_2S$ in accordance with the process of this invention.

Since the absorption equipment generally is made of metallic materials, the sorbent solution of this invention preferably contains an effective amount of at least one suitable metal corrosion inhibitor, such as those described in Encyclopedia of Chemical Technology, Kirk-Othmer, Volume 7, pages 135-142. It is understood that the corrosion inhibitor should not adversely interfere with the $H_2S$ absorption process of this invention. A presently preferred corrosion inhibitor is 2-mercaptobenzothiazole ($C_7H_5NS_2$), present at an effective level, more preferably at a concentration of about 0.02-0.2 g/l.

Any suitable contacting conditions can be employed in the process of this invention. In the $H_2S$ absorption step, the temperature can be in the range of from about 40° to about 200° F. (preferably about 50°-90° F.), and the pressure can be in the range of from about 0 to 100 psig (preferably about 0 psig). The time of contact between feed gas and absorbent solution can vary over a wide range (depending on the type of equipment) and generally is in the range of from about 0.1 minute to 10 hours (preferably about 10-60 minutes).

In the step for desorbing $H_2S$ from the spent sorbent solution, the temperature is generally in the range of from about 30° to about 220° F. (preferably about 50°-90° F.), and the pressure is generally in the range of from about 0.1 torr to about 2 atm., preferably from about 0.1 torr to about 1 atm. The desorbed $H_2S$ gas is generally swept away from the gas phase above the thus regenerated sorbent solution by a gas stream (e.g., an inert gas stream) or is pumped off.

Any suitable absorption apparatus and equipment can be employed in the $H_2S$ absorption process of this invention. Commercial absorption and desorption (regeneration) equipment for contacting a gas and a liquid sorbent and techniques for operating such equipment are well known to those skilled in the art, and are described in many technical publications, such as in "Encyclopedia of Chemical Technology", Kirk-Othmer, Volume 1, 1978, pages 53-55 and 88-96. The most common gas absorption technique is that of using countercurrent columns, equipped with bubble-trap plates, or sieve trays, or spray nozzles or the like, or filled with suitable packing materials, as described in the above-cited publication. Feed rates of feed gas and sorbent solution depend on specific column configuration composition of the feed gas, desired efficiency of $H_2S$ absorption and $H_2S/CO_2$ separation, and the like, and are readily optimized by those skilled in the art.

The sorbent solution of this invention can be regenerated by desorption of $H_2S$ as many times as a satisfactory $H_2S$ absorption capacity and $H_2S/CO_2$ separation efficiency of the regenerated sorbent solution is attained. The desorbed $H_2S$ can be utilized for a variety of end uses, e.g., for making mercaptans, for converting $H_2S$ to elemental sulfur in a Claus process, and the like.

The following examples are presented to further illustrate the invention and are not to be considered unduly limiting the scope of this invention.

EXAMPLE I

This example illustrates the experimental setup for measuring the rates of absorption of $H_2S$ and of $CO_2$ employing different aqueous absorbents. A glass apparatus, which could be evacuated by means of a pump to a pressure of about 0.1 torr (mm Hg) and then filled with a gas ($H_2S$ or $CO_2$) up to a pressure of 760 torr, was used for the absorption tests. The main parts of the glass apparatus were a gas reservoir bulb of about 100 cc capacity, an absorption flask of about 60 cc capacity with built-in rubber septum (through which liquid absorbent could be injected by means of a hypodermic syringe), and a MKS/Baratron pressure sensor with attached pressure gauge. The entire glass apparatus could also be isolated from the vacuum pump by means of a glass valve.

Four aqueous solutions were tested for their rates of absorption of $H_2S$ and $CO_2$, respectively: (A) 1.14 molar (1.14M) methyldiethanolamine (MDEA), (B) 1.14M triethanolamine (TEA), (C) 1.14M trisodium nitrilotriacetate ($Na_3NTA$) and (D) 1.14M tetrapotassium ethylenediaminetetraacetate ($K_4EDTA$). A sample of about 5 cc of one of these solutions was injected through the rubber septum into the absorption flask, which had been evacuated. The solution was stirred by means of a magnetic stirring bar placed inside the absorption flask, and was deaerated by means of a vacuum pump. Then the gas, $H_2S$ or $CO_2$, was introduced into the evacuated reservoir bulb through a gas inlet valve, which thereafter was closed again. The total gas pressure generally ranged from about 200 to about 800 torr. All parts of the glass apparatus were at room temperature (about 26° C.). The valve to the absorption flask was then opened and the resulting pressure was measured. Pressure measurements were generally made at time intervals of 1-2 minutes in $H_2S$ absorption tests and 10-20 minutes in $CO_2$ absorption tests.

EXAMPLE II

This example illustrates how the rates of absorption of $H_2S$ and $C_2$ by the two preferred absorbents of this invention, $Na_3NTA$ and $K_4EDTA$ (see Example I), compared with those by two commercially used absorbents, MDEA and TEA (see Example I).

Figure 2:
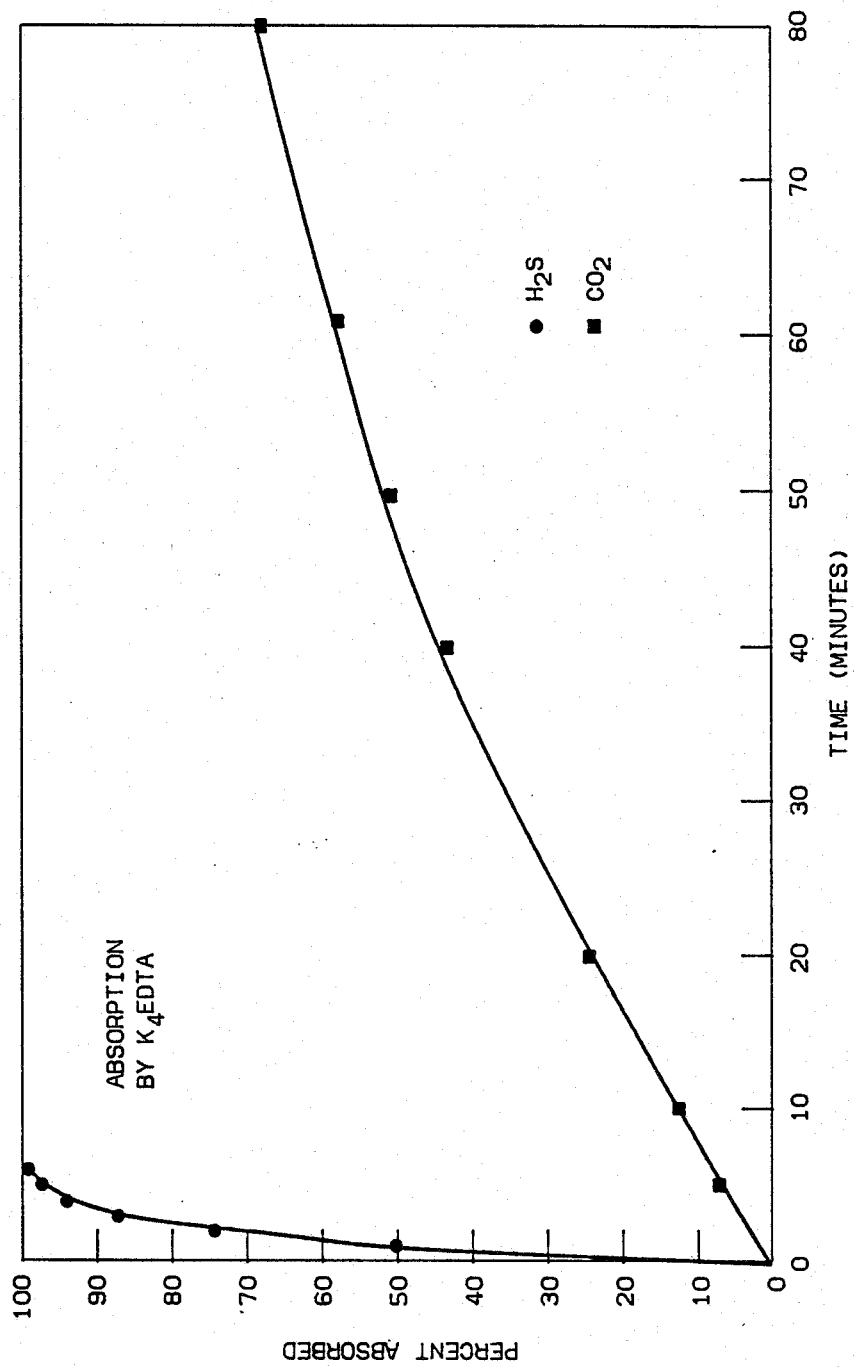
FIG. 2 shows the rate of absorption of $H_2S$ and $CO_2$ by a 1.14 molar aqueous solution of tetrapotassium ethylenediaminetetraacetate.
Figure 3:
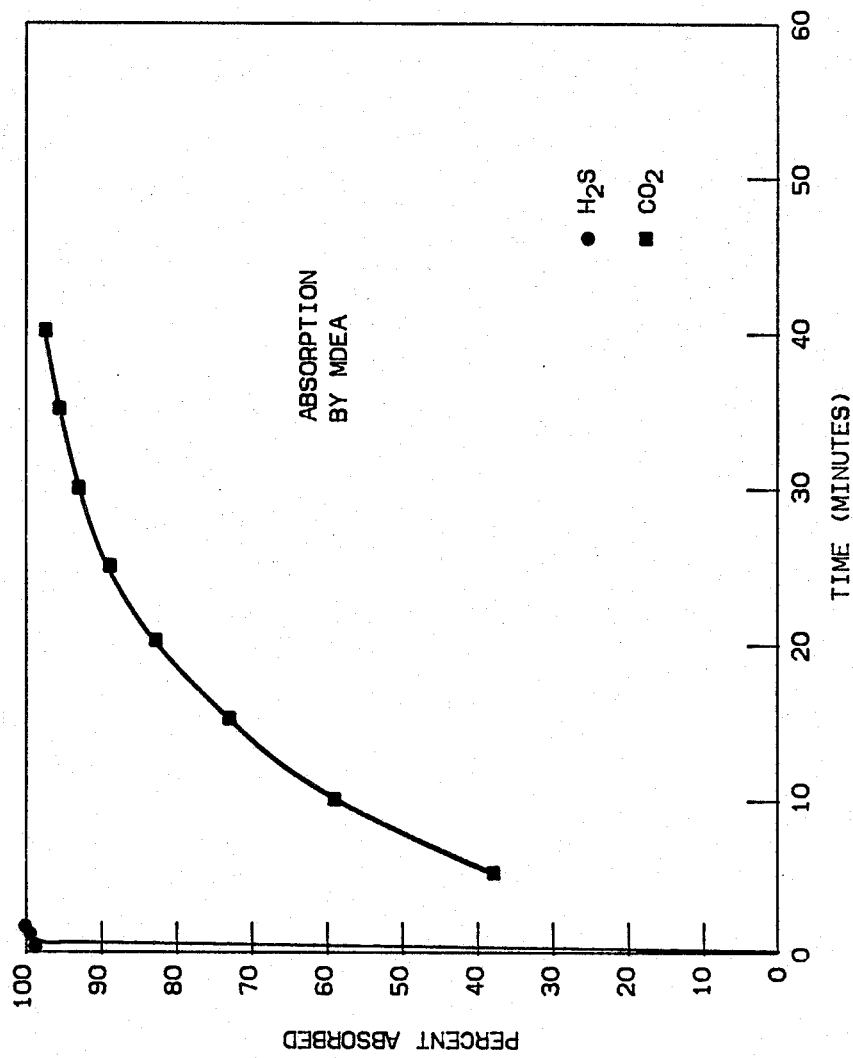
FIG. 3 shows the rate of absoprtion of $H_2S$ and $CO_2$ by a 1.14 molar aqueous solution of methyldiethanolamine.
Figure 4:
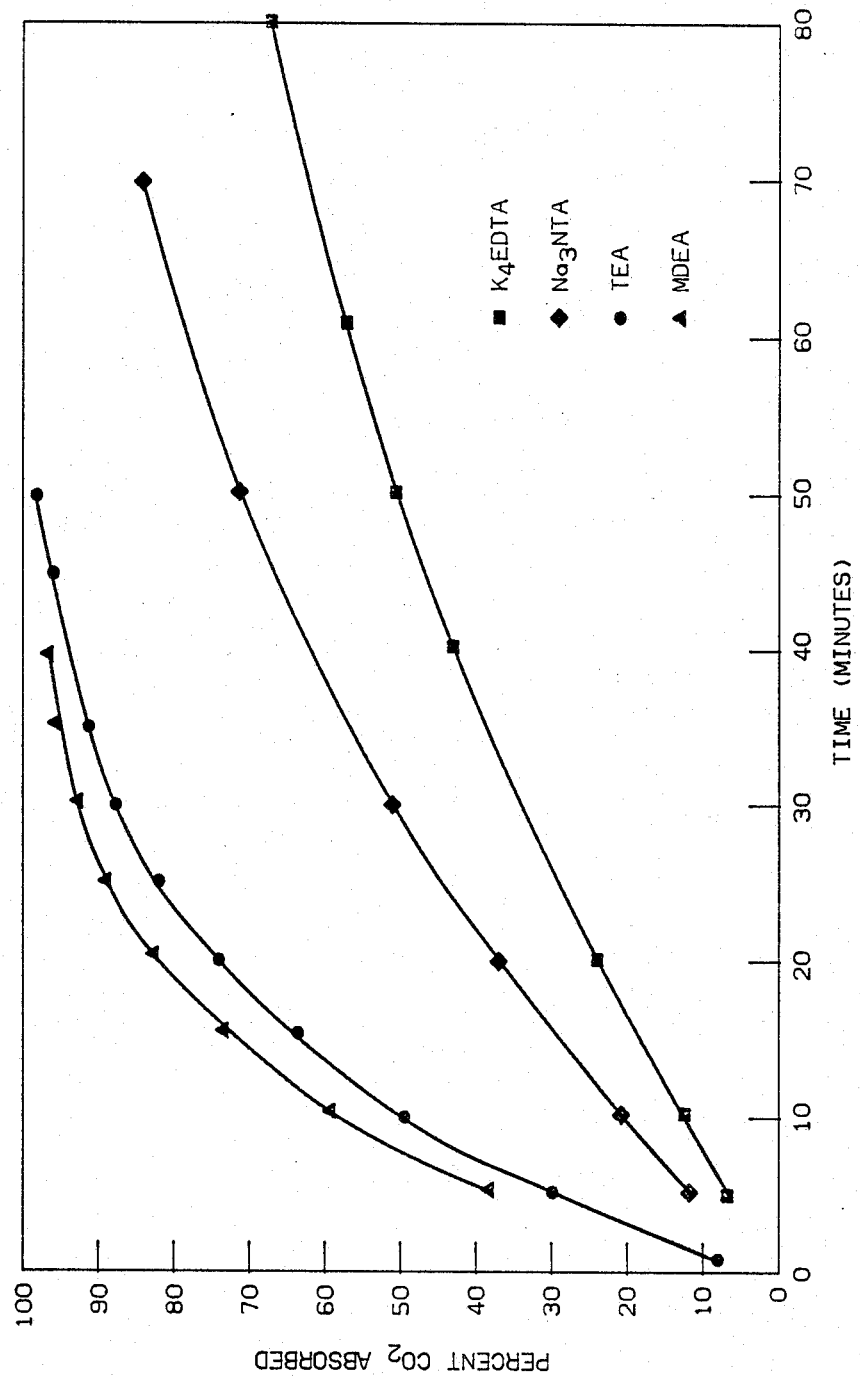
FIG. 4 compares the $CO_2$ absorption rates of 1.14 molar aqueous solutions of trisodium nitrilotriacetate, tetrapotassium ethylenediaminetetraacetate, methyldiethanolamine and triethanolamine.

FIGS. 1-3 show the absorption of $H_2S$ and $CO_2$, respectively, by $Na_3NTA$, $K_4EDTA$ and MDEA, as a function of time. FIG. 4 depicts the rate of absorption of $CO_2$ exhibited by $Na_3NTA$, $K_4EDTA$, MDEA and TEA. The absorption curves in FIGS. 1-4 were obtained in representative test runs, carried out in accordance with the procedure of Example I.

Test results depicted in FIGS. 1-3 show that the rates of absorption of $H_2S$ were quite high and were approximately the same for invention absorbents $Na_3NTA$ and $K_4EDTA$ and for control absorbent MDEA. However, the rates of absorption of $CO_2$ were considerably lower in invention tests with $Na_3NTA$ and $K_4EDTA$ than in control tests with MDEA and TEA (see especially FIG. 4). FIGS. 1-3 show that at the time when substantially all $H_2S$ was absorbed, less than about 10% of available $CO_2$ had been absorbed by $Na_3NTA$ and $K_4EDTA$, whereas more than 10% of available $CO_2$ had been absorbed by MDEA. Thus, $Na_3NTA$ and K4EDTA were more effective than MDEA in separating H2S and CO2.

EXAMPLE III

Figure 5:
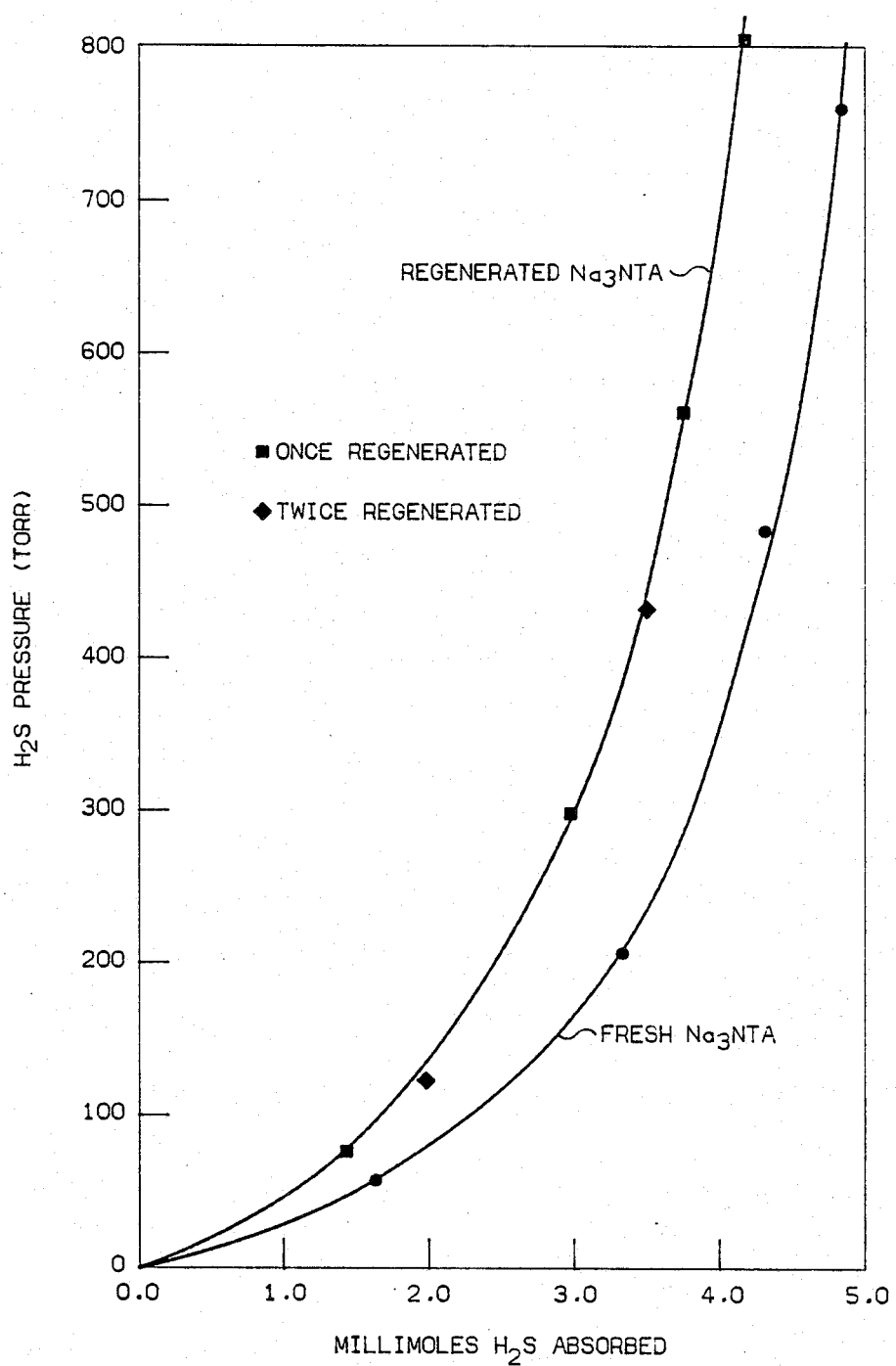
FIG. 5 depicts the $H_2S$ absorption capacity of fresh and regenerated aqueous 1.14 molar solutions of trisodium nitriolotriacetate.

This example illustrates that H2S can be desorbed from one of the absorbent solutions of this invention and that the absorbent solution can thus be regenerated. FIG. 5 shows the H2S absorption capacity of a fresh 1.14M Na3NTA solution, expressed as millimoles H2S absorbed at a given H2S pressure. The H2S-saturated Na3NTA solution was then cooled to 0° C., and a vacuum was applied for about 10 minutes so as to desorb as much H2S as possible. The thus regenerated Na3NTA absorption solution was then used again for H2S absorption. The second curve in FIG. 5 depicts the H2S absorption capacity of the regenerated Na3NTA solution. The H2S absorption capacity of the regenerated Na3NTA solution was about 80% of that of the fresh Na3NTA solution.

When the H2S-saturated regenerated Na3NTA solution was again subjected to a vacuum, the absorption capacity of the thus twice regenerated Na3NTA solution was essentially the same as that of the once regenerated Na3NTA solution. Thus, after the first regeneration step, which left about 20% of the absorbed H2S in the Na3NTA absorbent solution, essentially all absorbed H2S could be desorbed in a subsequent regeneration (desorption) step. This result indicates that the H2S absorbents of this invention can be repeatedly regenerated and reused for H2S absorption.

Reasonable variations, modifications and adaptation for various usages and conditions can be made within the scope of the disclosure and the appended claims, without departing from the scope of this invention.

That which is claimed is:

1. A process for absorbing hydrogen sulfide comprising the step of contacting a gas feed comprising hydrogen sulfide and carbon dioxide with
a solution comprising at least one dissolved sorbent selected from the group consisting of alkali metal ethylenediaminetetraacetate and alkali metal nitrilotriacetate,
in the substantial absence of oxidizing agents which can oxidize hydrogen sulfide, under such contacting conditions as to absorb a greater portion per unit time of H2S than CO2 from said gas feed.

2. A process in accordance with claim 1, wherein said gas feed contains from about 0.001 to about 10 volume percent H2S and from about 0.1 to about 10 volume percent CO2.

3. A process in accordance with claim 1, wherein said alkali metal is selected from the group consisting of sodium and potassium.

4. A process in accordance with claim 1, wherein said at least one dissolved sorbent is selected from the group consisting of tetrapotassium ethylendiaminetetraacetate and trisodium nitrilotriacetate.

5. A process in accordance with claim 1, wherein said solution is an aqueous solution.

6. A process in accordance with claim 1, wherein the concentration of said at least one sorbent in said solution is in the range of from about 0.5 to about 3 mol/l.

7. A process in accordance with claim 1, wherein said contacting is carried out in the substantial absence of oxidizing compounds of polyvalent metals.

8. A process in accordance with claim 1, wherein said contacting is carried out in the substantial absence of ferric compounds.

9. A process in accorance with claim 1, wherein said contacting is carried out at a temperature in the range of from about 40° to about 200° F. and at a pressure in the range of from about 0 to about 100 psig.

10. A process in accordance with claim 1, wherein said solution additionally contains an effective amount of a suitable metal corrosion inhibitor.

11. A process in accordance with claim 10, wherein said corrosion inhibitor is 2-mercaptobenzothiazole.

12. A process for absorbing hydrogen sulfide comprising the steps of
(a) contacting a gas feed comprising hydrogen sulfide and carbon dioxide in an absorption zone with a solution comprising at least one dissolved sorbent selected from the group consisting of alkali metal ethylenediaminetetraacetate and alkali metal nitrilotriacetate,
in the substantial absence of oxidizing agents which can oxidize hydrogen sulfide, under such contacting conditions as to absorb a greater portion per unit time of H2S than CO2 from said gas feed; and
(b) substantially desorbing hydrogen sulfide, which has been absorbed by said solution, so as to obtain a regenerated solution.

13. A process in accordance with claim 12, where the following compounds are substantially absent from said solution used in step (a): hydrogen peroxide, iron compounds containing Fe in the oxidation state +3, tin compounds, containing Sn in the oxidation state +4, vanadium compounds containing V in the oxidation state +5, chromium compounds containing Cr in the oxidation state +6, molybdenum compounds containing Mo in the oxidation state +6, manganese compounds containing Mn in the oxidation state +6, manganese compounds containing Mn in the oxidation state +7, and cobalt compounds containing Co in the oxidation state +3.

14. A process in accordance with claim 12, wherein oxidizing gases, which can oxidize hydrogen sulfide to elemental sulfur or to compounds containing sulfur in a positive oxidation state, are substantially absent from said gas feed.

15. A process in accordance with claim 12, wherein said at least one sorbent is selected from the group consisting of tetrapotassium ethylenediaminetetraacetate and trisodium nitrilotriacetate.

16. A process in accordance with claim 12, wherein step (b) is carried out at a temperature in the range of from about 30° to about 220° F. and a pressure in the range of from about 0.1 torr to about 1 atmosphere.

17. A process in accordance with claim 12, additionally comprising the steps of
(c) removing hydrogen sulfide which has been desorbed in step (b) from the gas phase above said regenerated solution.

18. A process in accordance with claim 12 comprising the additional step of
(d) recycling said regenerated solution obtained in step (b) to said absorption zone of step (a).

19. A process in accordance with claim 18, wherein said contacting in step (a) is carried out with said regenerated solution which has been reycled in step (d).

20. A process in accordance with claim 12, wherein essentially no oxidation of hydrogen sulfide to elemental sulfur occurs during said contacting.

* * * * *